C. ROPP.
Corn Planter.
No. 25,675.
Patented Oct. 4, 1859.
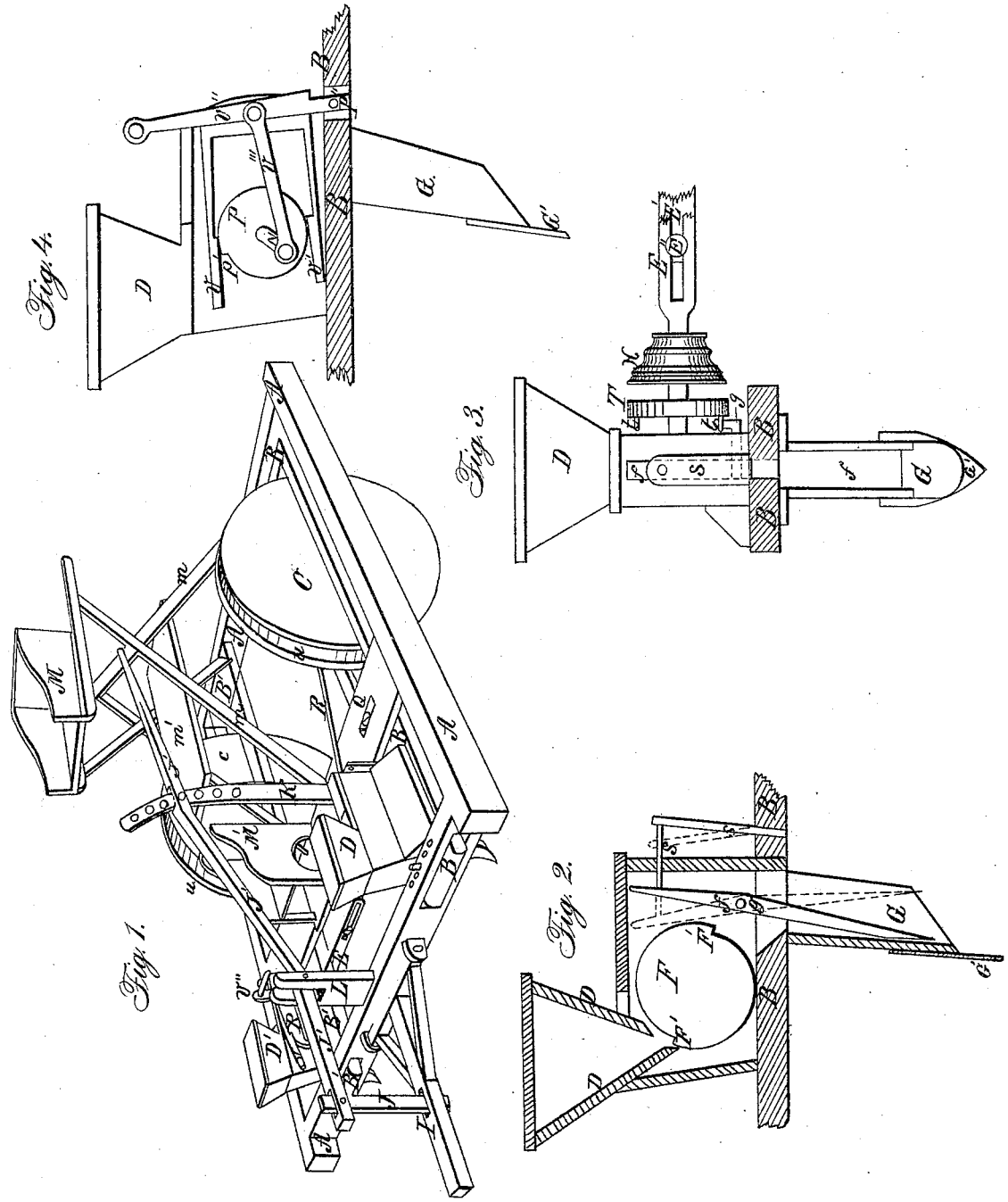
Witnesses:
Joseph B Babcock
Joseph Sersyh
Inventor:
Christian Ropp

UNITED STATES PATENT OFFICE.

CHRISTIAN ROPP, OF McLEAN COUNTY, ILLINOIS.

IMPROVEMENT IN CORN-PLANTERS.

Specification forming part of Letters Patent No. 25,675, dated October 4, 1859.

*To all whom it may concern:*

Be it known that I, CHRISTIAN ROPP, of the county of McLean, and State of Illinois, have invented a new and useful Improvement in Corn-Planters; and I do hereby declare that the following is a full, clear, and exact description thereof, reference being had to the accompanying drawings, and to the letters of reference marked thereon, and made to form a part of this specification.

My invention relates to certain improvements in corn-planters, by means of which I am enabled to plant two rows of corn at a time, to adjust and regulate the distance between said rows, and also the distance between the hills of corn, as hereinafter set forth and described.

In reference to the accompanying drawings, Figure 1 is a perspective view of the planter with all its parts arranged for use. Fig. 2 is a sectional view of the seeding device. Fig. 3 is a sectional view, showing the device for operating the feed-wheels. Fig. 4 is a sectional view, showing the provision for adjusting the feed-wheel.

A represents the frame-work of the planter.

C C' are the supporting-wheels, formed with flanges $u$, which facilitate the covering of the corn. The axles of the wheels C C' have bearings in the movable bed-pieces B B', by means of which said wheels are adjustable laterally.

M M' are seats for the operators.

J J' is a bent lever pivoted to post L of the frame A and to post J'' of the pole I, and extending back to the post K, at which it may be properly adjusted with reference to the elevation of the forward part of the planter, or to the desired depth at which the plows G' may run in the ground, by means of a pin passing through the perforations of the post K and through said lever, as clearly represented in Fig. 1.

D are seed-hoppers arranged upon the seed-boxes D' in such manner as to deliver the seed to the feed-wheel F, as clearly shown in Fig. 2. The box D' is provided with a stop, $f$, (shown clearly in Figs. 2 and 3,) by means of which the seed may be prevented from falling to the ground, except at the proper times. This stop is operated by means of wheel T through the medium of pins $t$ and bent rod $g$, and also by means of spring $s$ and cord $s'$.

G are tubular plow-shafts provided with plows G', and attached to the bed-pieces B B'.

F are feed-wheels arranged within the boxes D', formed with notches F', and attached or keyed to the connecting-rod E E', from which they receive motion through medium of the graduated pulley H and a corresponding pulley which is attached to the axle of wheel C'.

The entire seeding device above described, being secured to the movable bed-pieces B B', is adjustable laterally in harmony with the wheels C C' in such manner as to regulate the required space or distance between the rows of corn.

E E is a connecting-rod formed in two parts, made with a crank, $z$, (shown in Fig. 4,) and adjustable laterally by means of slots and set-screws, as shown clearly in Figs. 1 and 4.

R is a band passing around the graduated pulleys H and that of the wheel C'. By adjusting the band R with reference to the graduations of said pulleys any required distance between the hills of corn may be secured. Attached to the connection-rod E' E' is a wheel, P, formed with a notch, P'.

U'' is a lever pivoted to the bed-piece B' at P'', and provided with spring-catches U U', which are arranged, with reference to the notch P', in such manner that the operation of the seeding device may be stopped when the planter is made to move backward.

U''' is a rod fixed upon the crank $z$ of the connection-rod, and pivoted to the lever U'', by means of which the operator may adjust the feed-wheel F in such manner that the deposits of seed may be made at the proper places, when commencing to plant the rows, with reference to the hills of corn previously planted, so that with proper care the corn may be deposited uniformly in check-rows.

The operation of my invention may be described as follows: The seeding device and wheels C C' being adjusted to the width required between the rows of corn to be planted, and the band R being adjusted upon the graduated pulleys in such manner that the deposits of corn may be made at the proper desired intervals, and the lever J J' being properly secured to the post K, as before described, with reference to the required depth of the plows G' in the ground, seed being placed in the hopper D, and the planter being made to move forward, the feed-wheel F will be made to rotate in the direction of the arrow by means of the pulleys and band R, as before described, and the corn will be received from the hopper D by notches F', carried over the wheel F and deposited in the tube of the plow-shaft G in front of the stop $f$. At this period of the operation of the planter one of the pins $t$ of the wheel T will come in contact with the bent portion of the rod $g$, as shown clearly in Fig. 3, by means of which the lower end of the stop $f$ will be retracted, as shown by red lines in Fig. 2, and the corn permitted to fall into the furrows made by the plows G'. When the pin $t$ has released the rod $g$ the stop $f$ is made to resume its closed position by means of the spring $s$ and cord $s'$. The deposited corn will be covered by means of the flanged wheels C C' as the planter moves forward.

Having described the construction and operation of my invention, I claim—

The arrangement of dog-wheel P, levers U'' and U''', stops U and U', with stops $f$, springs $s$, bent rods $g$, and feed-wheels F F', the whole being constructed substantially as and for the purpose set forth.

In testimony of which invention I have hereunto set my hand.

CHRISTIAN ROPP.

Witnesses:
JOSEPH B. BABCOCK,
JOSEPH SCHERTZ.